United States Patent [19]

Maruno

[11] Patent Number: 5,485,547
[45] Date of Patent: Jan. 16, 1996

[54] RECOGNITION UNIT AND RECOGNIZING AND JUDGING APPARATUS EMPLOYING SAME

[75] Inventor: Susumu Maruno, Osaka, Japan

[73] Assignee: Matsushita Electric Industrial Co., Ltd., Osaka, Japan

[21] Appl. No.: 25,743

[22] Filed: Mar. 3, 1993

Related U.S. Application Data

[63] Continuation of Ser. No. 700,804, May 16, 1991, Pat. No. 5,265,224.

[30] Foreign Application Priority Data

May 16, 1990 [JP] Japan .................................... 2-127286
Oct. 3, 1990 [JP] Japan .................................... 2-266927

[51] Int. Cl.$^6$ ......................... G06K 9/66; G06F 15/18; G06F 15/80
[52] U.S. Cl. ......................................................... 395/24
[58] Field of Search ................................. 395/23, 24, 21

[56] References Cited

U.S. PATENT DOCUMENTS

| | | | |
|---|---|---|---|
| 4,805,225 | 2/1989 | Clark | 382/15 |
| 4,811,404 | 3/1989 | Vilmur et al. | 381/94 |
| 5,033,006 | 7/1991 | Ishizuka et al. | 364/513 |
| 5,052,043 | 9/1991 | Gaborski | 382/14 |
| 5,058,184 | 10/1991 | Fukushima | 382/37 |
| 5,063,521 | 11/1991 | Peterson et al. | 395/27 |
| 5,085,526 | 2/1992 | Sawtell et al. | 374/101 |
| 5,151,969 | 9/1992 | Petsche | 395/24 |
| 5,155,802 | 10/1992 | Mueller et al. | 395/24 |

OTHER PUBLICATIONS

Graf et al; "A Reconfigurable CMOS Neural Network", IEEE Intl. Solid–State Circuits Conf., Feb. 1990, 144–145.
Jockusch, S., "A Neural Network which Adapts its structure to a given set of Patterns," Parallel Proc. in Neural Syst. and Computers, 1990, 169–172.
Satyanarayana et al., "A Reconfigurable Analog VLSI Neural Network Chip," Advances in Neural Information Processing Systems 2, Morgan Kaufmann Pub., 1990, 758–768.
"Multi–Functional Layered Network Using Quantizer Neurons", Susumu Maruno, International Symposium Computer World '90, Nov. 7–9, 1990, Kobe, Japan, pp. 202–290.
"Message–Based Response Routing with Selcuk Networks", Kenan E. Sahin, IEEE Transactions On Computers, vol. C–23, No. 12, pp. 1250–1257; Dec. 1974.
IJCNN International Joint Conference On Neural Networks, "A Network With Multi–Partitioning Units", Tan et al., Sheraton Washington Hotel, Jun. 19–22, 1989, pp. II–439–II–442.
"The Project Alias: An Application of Collective Learning Systems Theory To An Adaptive Learning Image Analysis System", Bock et al. Int'l Workshop of Neural Networks & Their Applications, Nov. 13–16, 1989, pp. 407–427.
"Designing a Layered Network for Context Sensitive Pattern Classification", Thacker et al., Neural Networks, 1990, pp. 291–299.
Kunihiko Fukushima, "Neocognitron: A Hierarchical Network For Visual Pattern Recognition", from Fuzzy Computing, 1988, pp. 53–69.
Kung & Hwang, "An Algebraic Projection Analysis For Optimal Hidden Units Size And Learning Rates in Back–Propagation Learning", IEEE Int'l Conf. on Neural Networks, S.D. Calif., Jul. 24–27, 1988, pp. 363–370.

(List continued on next page.)

Primary Examiner—Robert W. Downs
Attorney, Agent, or Firm—Wenderoth, Lind & Ponack

[57] ABSTRACT

A recognizing and judging apparatus includes a plurality of recognition units organized in a multi-layered hierarchical network structure. Some recognition units include a signal input section for receiving a signal to be recognized, a quantizer for performing a quantization according to the signal inputted from the signal input section, and a path selecting section having at least one path input terminal and at least one path output terminal. The path selecting section performs a selection of paths according to an output of the quantizer.

3 Claims, 14 Drawing Sheets

OTHER PUBLICATIONS

Patrice Gelband, "Neural Selective Processing And Learning", IEEE Int'l Conf. on Neural Networks, S.D. Calif., Jul. 24–27, 1988, pp. 417–424.

Chiueh & Goodman, "Learning Algorthms For Neural Networks With Ternary Weights", 1st Annual Meeting of Int'l Neural Networks Society, Sep. 1988, Pasadena, Calif., pp. 166.

Ehud D. Karin, "A Simple Procedure For Pruning Back–Propagation Trained Neural Networks", IEEE Transactions On Neural Networks, vol. 1, No. 2, Jun. 1990, pp. 239–242.

$$y[j] = fnc(net[j])$$
$$= fnc(\sum_i (w[i,j] * y[i]))$$

RECOGNITION UNIT AND RECOGNIZING AND JUDGING APPARATUS EMPLOYING SAME

This is a continuation application of Ser. No. 07/700,804, filed May 16, 1991, now U.S. Pat. No. 5,265,224.

BACKGROUND OF THE INVENTION

1. Field of the Invention

The present invention relates to a recognition unit and a recognizing and judging apparatus employing a plurality of recognition units for recognizing and judging an object according to various characteristic data of the object.

2. Description of the Prior Art

FIG. 1 is a block diagram indicating a conventional recognizing and judging apparatus, which comprises a template comparator 1 having a signal input terminal 2 and a signal output terminal 3, a plurality of templates 4–7 of input signal patterns prepared in advance, and a learning device 8 having a teacher signal input terminal 9.

A series of signals representative of an object to be recognized are inputted from the signal input terminal 2 to the template comparator 1. The template comparator 1 compares a pattern of the inputted signals with each of the templates 4–7 and outputs the number of a template having the smallest error as a recognition result from the signal output terminal 3. If the output result is incorrect, the number of a template to which the inputted signals should belong is inputted from the teacher signal input terminal 9 to the learning device 8, thereby modifying an appropriate template to improve the recognizing percentage.

In the conventional recognizing and judging apparatus as described above, because it is necessary to compare the inputted signals with all the templates, it takes very long time to make comparisons. Furthermore, because it is necessary to prepare the same number of templates as the kinds of patterns to be classified and recognized, a memory having a large capacity for storing all the templates is required. In addition, learning to be performed by modifying the appropriate template needs a lot of time.

A learning type recognizing and judging apparatus is known, for example, in "Learning Representations by Back-Propagating Errors" written by D. E. Rumelhart et al. and reported in Vol. 323, No. 9 (1986) of "Nature".

FIG. 2 is a block diagram indicating the structure of one of conventional learning type recognizing and judging apparatus, which comprises a plurality of input terminals 11 and 12, a plurality of output terminals 22, a learning circuit 27, a plurality of multi-input/output circuits 28–30, an output layer 31, and a hidden layer 32. As shown in FIG. 2, the plurality of multi-input/output circuits 28–30 are organized in a hierarchical manner in the learning type recognizing and judging apparatus, in which signals inputted from the input terminals 11 and 12 are processed and outputted from the output terminals 22. Of the hierarchically organized multi-input/output circuits 28–30, a layer containing multi-input/output circuits for outputting signals is called the "output layer" whereas a layer containing multi-input/output circuits other than those contained in the output layer is called the "hidden layer". The hidden layer may consist of either a single layer or a plurality of layers each including multi-input/output circuits.

FIG. 3 is a block diagram indicating the structure of another conventional learning type recognizing and judging apparatus, which comprises input terminals 41 and 42, a plurality of variable weight multipliers 43–48, a plurality of adders 49–51 each having a saturation input/output characteristic, an output terminal 52, a teacher signal generating section 53, an error calculating section 54, a steepest-descent-direction deciding section 55, a weight changing section 56, a learning circuit 57, a plurality of multi-input/output circuits 58–60, an output layer 61, and a hidden layer 62. As shown in FIG. 3, each of the multi-input/output circuits 58–60 includes two variable weight multipliers and one adder having the saturation input/output characteristic. More specifically, an output signal of the j-th multi-input/output circuit is expressed as:

$$y[j] = fnc\left( \sum_i (w[i,j] * y[i]) \right), \qquad (1)$$

where $y[i]$ is an output signal of the i-th multi-input/output circuit of the preceding layer; $w[i,j]$ is a weight to be applied when the output signal of the i-th multi-input/output circuit of the preceding layer is inputted to the j-th multi-input/output circuit; and $fnc(\ )$ is a function having a saturation characteristic and is expressed by, for example, the following Sigmoid function:

$$fnc(x) = \frac{2}{1+\exp(-x)} - 1.$$

FIG. 4 is a graph representative of the characteristic function of the adders 49–51 each having a saturation input/output characteristic expressed by the above $fnc()$. As described above, the learning type recognizing and judging apparatus has a structure in which multi-input/output circuits are hierarchically connected with each other. During learning, weights applied to the variable multipliers 43–48 are changed so that a desirable output signal (hereinafter referred to as a teacher signal) may be outputted in response to input signals. First, an error is found from the teacher signal and the output signal of the output layer in order to determine the amount of changes of the weights.

$$\begin{aligned} E &= 0.5 * \sum_p \sum_j (t_p[j] - y_p[j])^2 \\ &= E(\vec{w}) \end{aligned} \qquad (2)$$

where $y_p[j]$ is an output signal of the j-th multi-input/output circuit of the output layer in response to the p-th input signal; $t_p[j]$ is a teacher signal with respect to $y_p[j]$;

$$\sum_p$$

is the sum of all the teacher signals;

$$\sum_j$$

is the sum of all the multi-input/output circuits of the output layer; and $\vec{w}$ is a vector (hereinafter $\vec{w}$ is referred to as a weight vector) having $w[i,j]$ as a component. As indicated by Equation (2), the error E is expressed by the sum of squares of the differences between the teacher signals and the corresponding output signals of the output layer and is a function of the weight vector $\vec{w}$. During the learning, the weights are changed and the differences between the teacher signals and actual output signals, namely the error, are minimized. The amount of changes of the weights is determined by $$\Delta \vec{w} = -\epsilon * \frac{\partial E}{\partial \vec{w}} + \alpha * \Delta \vec{w}' \qquad (3)$$

where $\epsilon$ is a positive constant called the "learning parameter"; $\alpha$ is a positive constant called the "momentum";

$$\frac{\partial E}{\partial \vec{w}}$$

is a vector of the partial derivative of the error E expressed by Equation (2) with respect to a weight w[i, j] and is called the "steepest descent direction"; and $\Delta \vec{w}'$ is a vector expression of the amount of changes of the weights in the previous learning.

FIG. 5 schematically depicts the structure of the learning circuit 57 of the conventional learning type recognizing and judging apparatus. The learning circuit 57 has an input terminal 63 for receiving output signals from the output layer, an input terminal 64 for receiving output signals from the hidden layer, an input terminal 65 for receiving input signals, an output terminal 66 for outputting weights to the output layer, and an output terminal 67 for outputting weights to the hidden layer. In this learning circuit 57, the teacher signal generating section 53 generates a teacher signal $t_p[j]$ (desirable output signal) in response to an input signal. The error calculating section 54 calculates the error E expressed by Equation (2) based on the teacher signal $t_p[j]$ and the output signal $y_p[j]$ of the output layer. The error calculating section 54 outputs a difference signal $t_p[j]-y_p[j]$ between the teacher signal required for changing the weights and the output signal to the steepest-descent-direction deciding section 55. The steepest-descent-direction deciding section 55 finds the steepest descent direction of the error E in a space of weights, in which the weights are expressed in vector, based on output signals of the output layer, output signals of the hidden layer, input signals, and weights of the output layer. The steepest descent direction is found by:

$$\vec{g} = -\frac{\partial E(\vec{w})}{\partial \vec{w}}. \quad (4)$$

The right side of Equation (4) is a vector expression of the partial derivative of the error E with respect to the weight. The steepest-descent-direction deciding section 55 multiplies the steepest descent direction by the learning parameter and outputs the result to the weight changing section 56. The weight changing section 56 finds the amount of changes of the weights using Equation (3), thereby changing the weight to be multiplied in each of the variable weight multipliers 43–48. As described above, iteratively finding the amount of changes of the weights by the use of the steepest descent method can reduce the error. When the error becomes considerably small, the learning is terminated by reason that the output signal has reached a satisfactorily desirable value.

In the conventional recognizing and judging apparatus of the above-described type, the structure of a network cannot be altered from a fixed state initially defined or designed. Accordingly, since the learning and the recognition ability are determined by the initial design, the apparatus cannot provide an appropriate processing according to input data. Furthermore, any method of designing the network has not been established and actual designing fully depends upon trial and error based on experience and perception.

SUMMARY OF THE INVENTION

The present invention has been developed to overcome the above-described disadvantages.

It is accordingly an object of the present invention to provide a recognition unit for use in a recognizing and judging apparatus which enables learning and recognizing processings to be effectively performed in a short period of time without requiring any templates.

Another object of the present invention is to provide a recognizing and judging apparatus of the above-described type which enables not only learning to be made in response to input data, but also the structure of a network to be automatically appropriately altered, constructed, and self-organized in response to input signals.

In accomplishing these and other objects, a recognition unit according to the present invention comprises a signal input section, a quantizer for performing a quantization according to a signal inputted from the signal input section, and a path selecting section having at least one path input terminal and at least one path output terminal. The path selecting section performs a selection of paths according to an output of the quantizer.

A recognizing and judging apparatus includes a plurality of recognition units organized in the form of a multi-layered hierarchical network.

In this apparatus, various characteristic data of an object to be recognized are initially inputted to the signal input sections of the recognition units in some upper layers. Connecting paths between the recognition units are then switched according to outputs of the quantizers of the recognition units, and a desired path leading to the lower-most layer is selectively determined so that a recognition result may be obtained. Therefore, recognition processing and learning of the object can be performed at a high speed.

In another aspect of the present invention, a recognition unit comprises a basic unit having at least a signal input section, a function-processing section and a signal output section, a structure storage means for storing a structure of the basic unit, an internal state storage means for storing an internal state of the basic unit, and a duplicating means for duplicating the basic unit based on the internal state of the basic unit stored in the internal state storage means.

Upon input of various characteristic data of an object to the signal input sections of a plurality of recognition units organized in a hierarchical manner, the internal state stored in the internal state storing means changes according to input data. When the internal state reaches a certain state, the duplicate means duplicates some recognition units at respective appropriate locations based on the structure of a network stored in the internal state storing means. As a result, the network is reconstituted in the apparatus so as to automatically adapt itself to the input data.

The basic unit may be comprised of a signal input section, a quantizer for performing a quantization according to a signal inputted from the signal input section, and a path selecting section having at least one path input terminal and at least one path output terminal.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
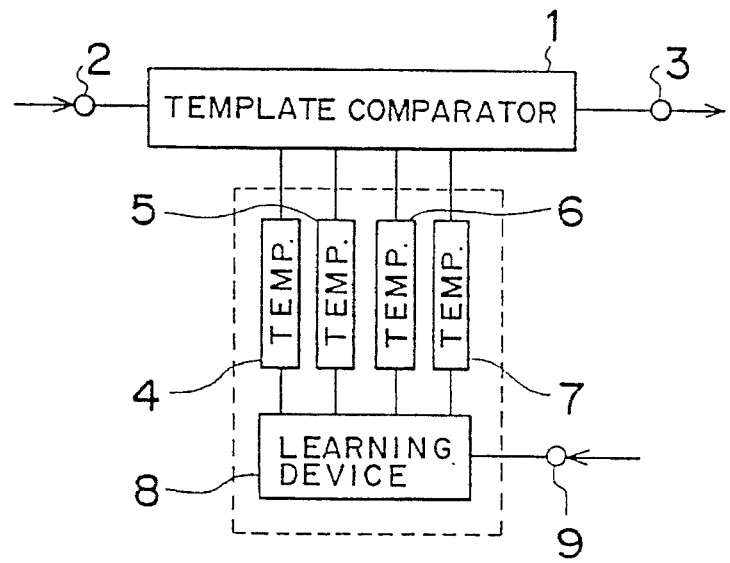
FIG. 1 is a block diagram of a conventional recognizing and judging apparatus.
Figure 2:
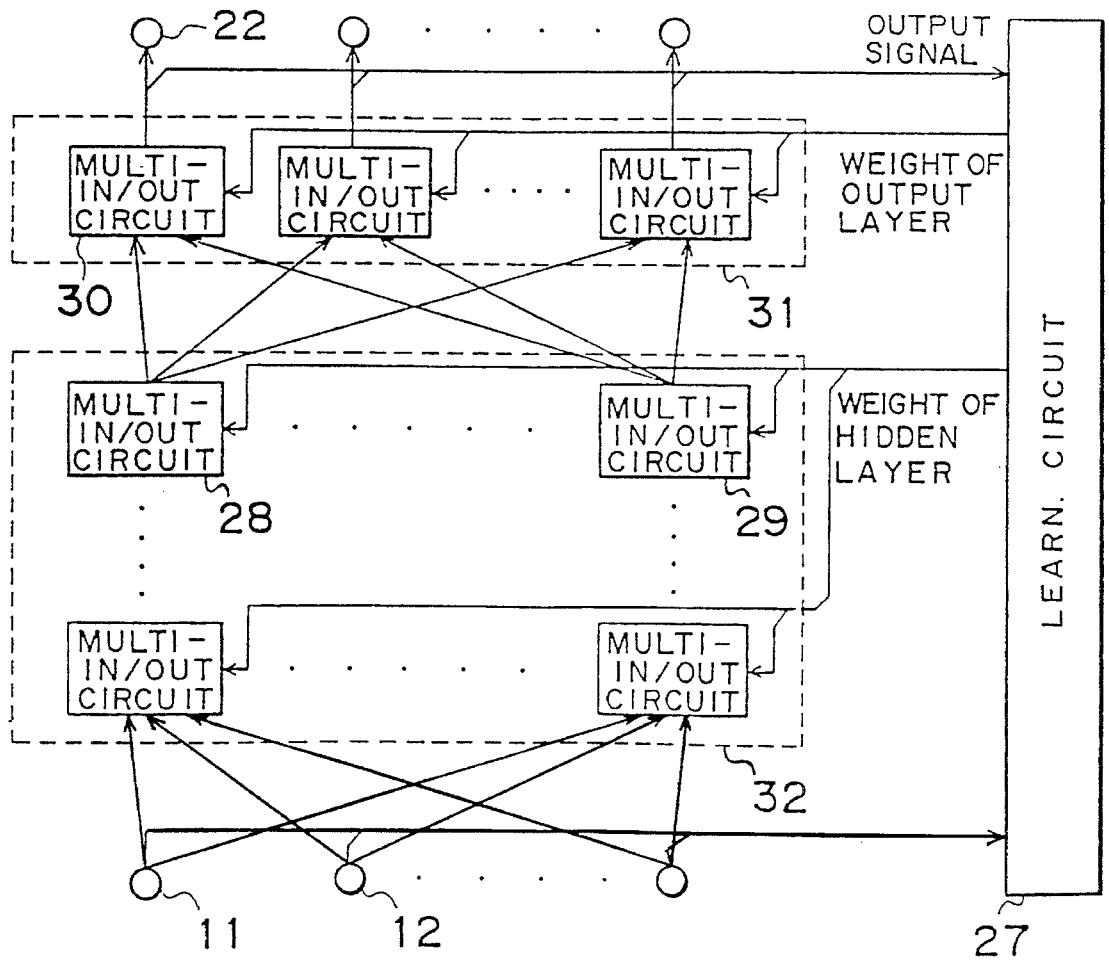
FIG. 2 is a block diagram of a conventional learning type recognizing and judging apparatus.
Figure 3:
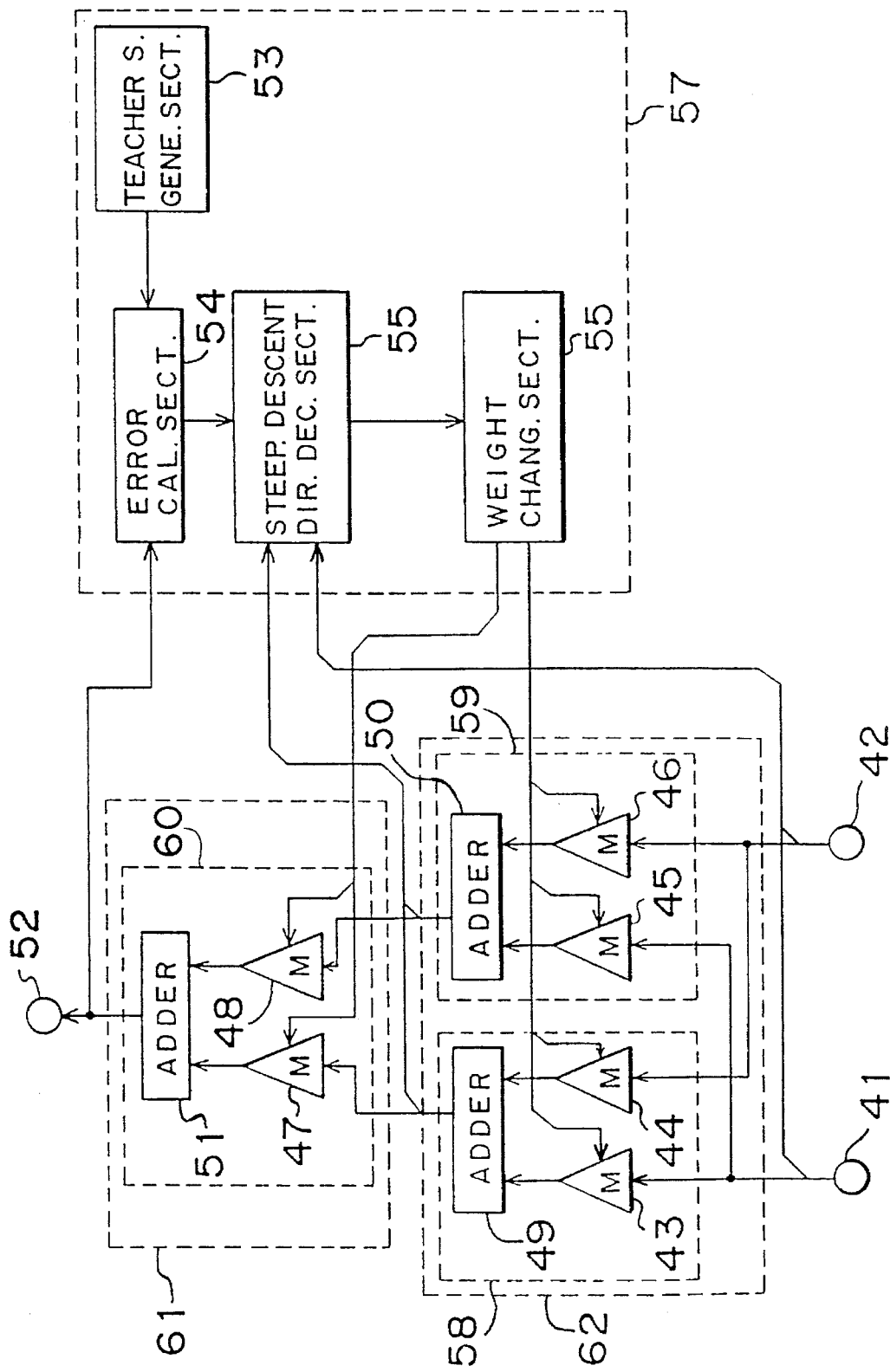
FIG. 3 is a detailed block diagram of the apparatus of FIG. 2.
Figure 4:
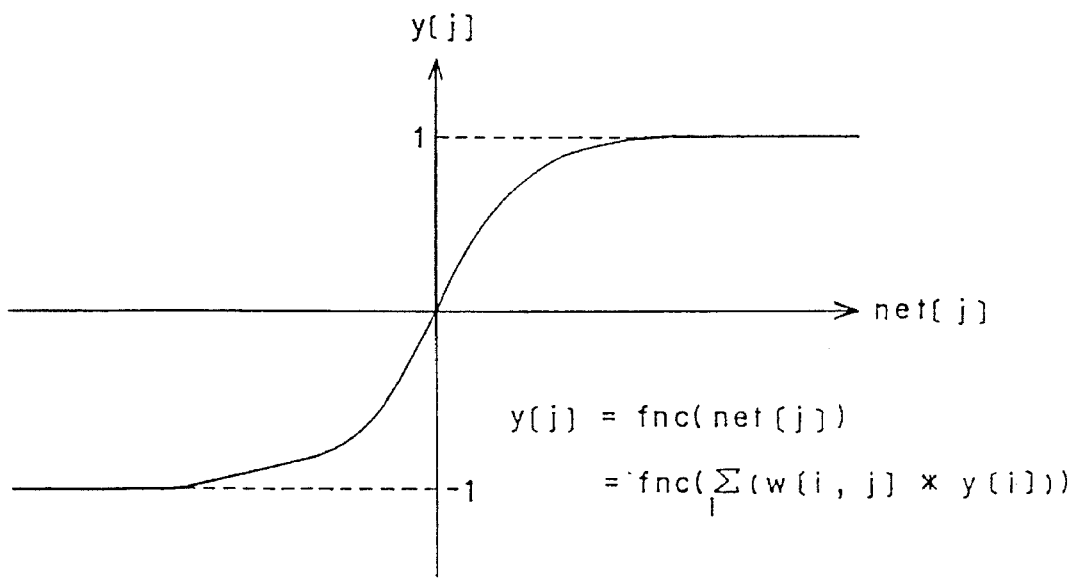
FIG. 4 is a graph representative of a characteristic function of adders provided in the apparatus of FIG. 2.
Figure 5:
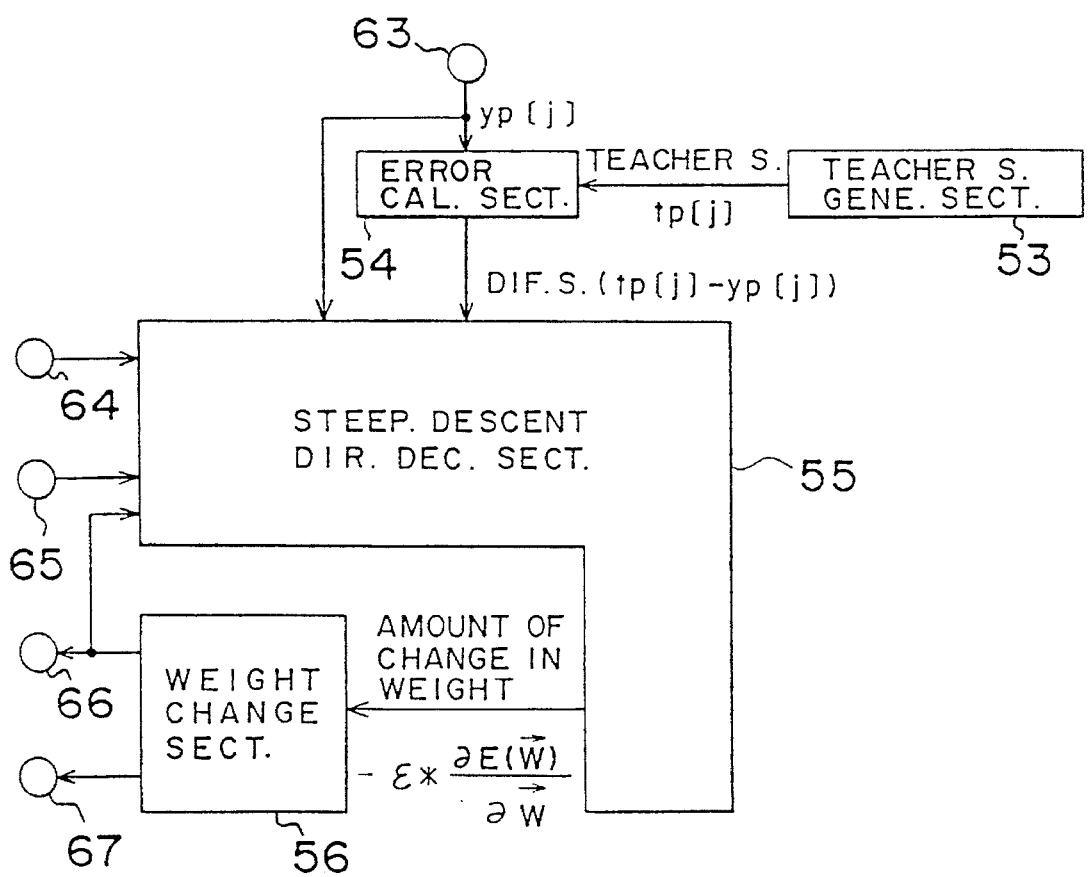
FIG. 5 is a block diagram of a learning circuit provided in the apparatus of FIG. 2.
Figure 6:
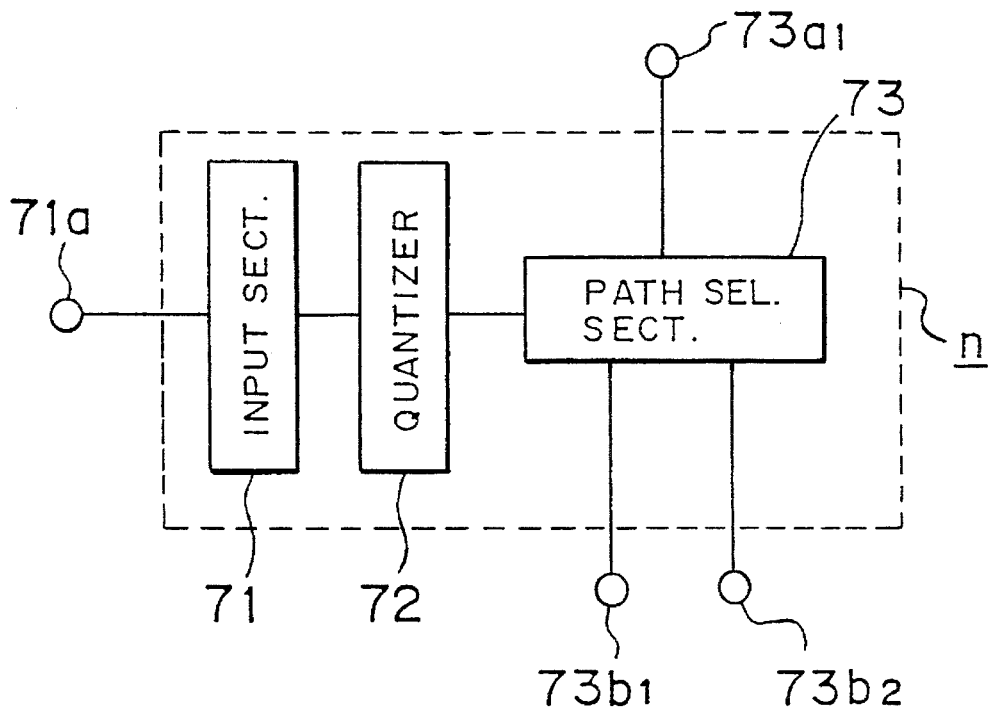
FIG. 6 is a block diagram of a recognition unit according to a first embodiment of the present invention.

Referring now to the drawings, there is schematically shown in FIG. 6 a recognition unit according to a first embodiment of the present invention. The recognition unit comprises a signal input-section 71 to which characteristic data to be recognized are inputted via a signal input terminal 71a, a quantizer 72 for quantizing the inputted characteristic data, and a path selecting section 73 for changing the connection between a path input terminal 73a1 and path output terminals 73b1 and 73b2 based upon a value quantized by and inputted from the quantizer 72. When a network is constituted by the combination of a plurality of recognition units, respective terminals 73a1, 73b1 and 73b2 of the recognition units are connected with one another.

Figure 7:
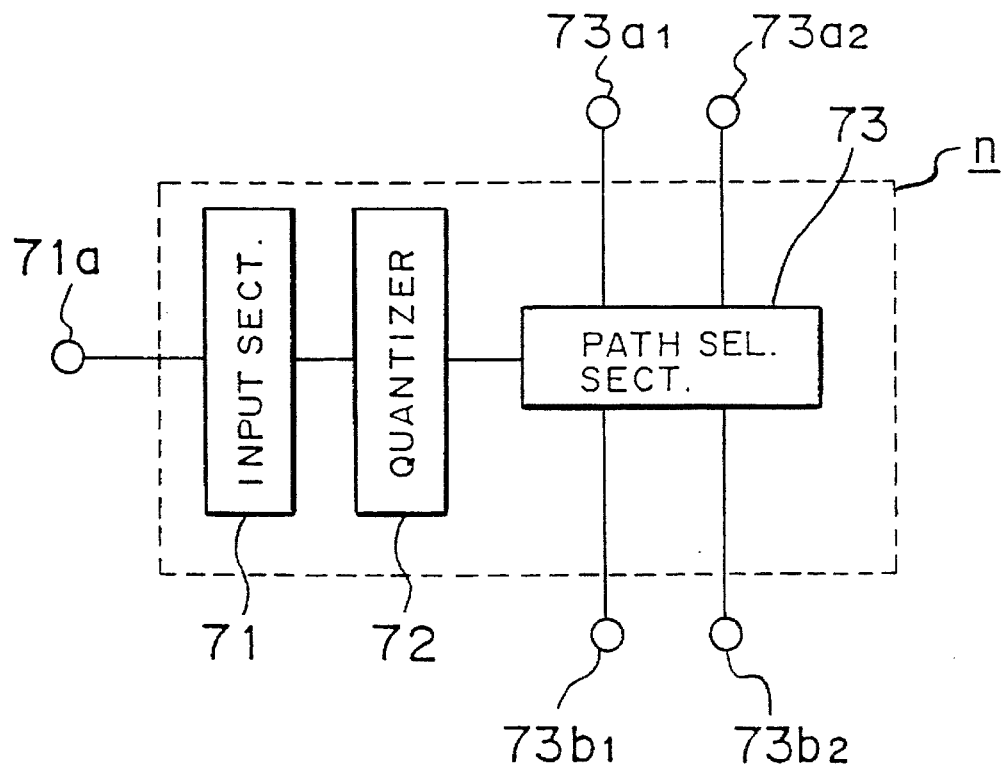
FIG. 7 is a diagram similar to FIG. 6, according to a second embodiment of the present invention.

FIG. 7 schematically shows a recognition unit according to a second embodiment of the present invention, in which a plurality of path input terminals (in this case, two terminals 73a1 and 73a2) are provided. This recognition unit can be operated similarly to that shown in FIG. 6.

Figure 8:
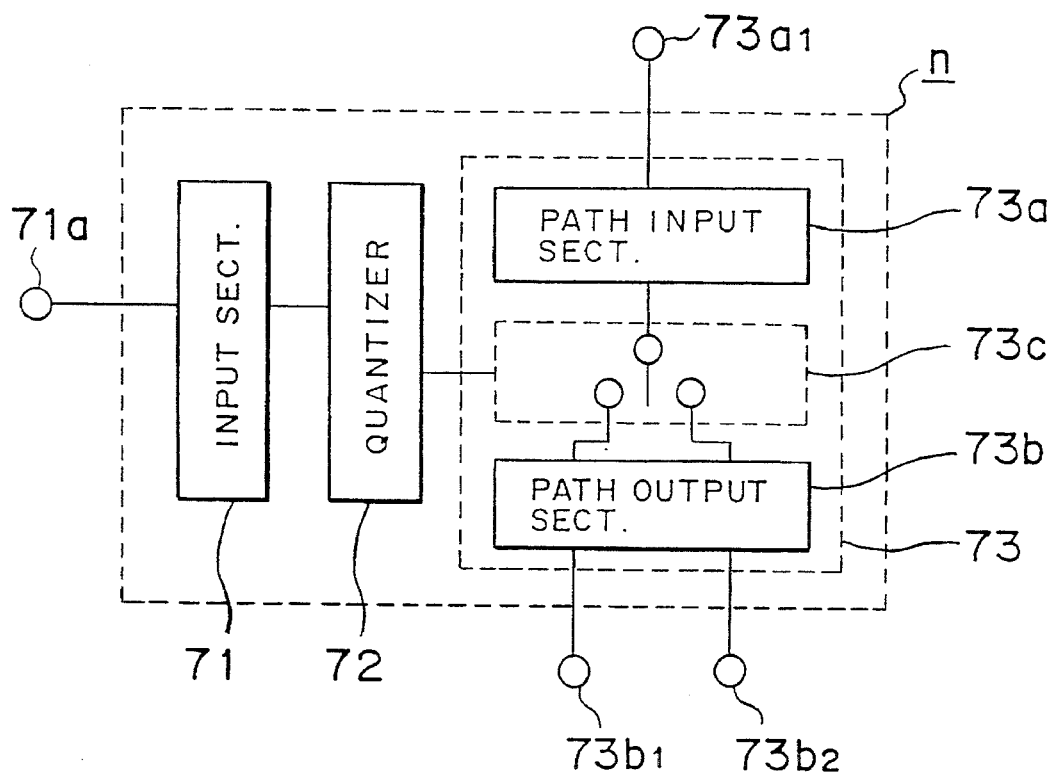
FIG. 8 is a diagram similar to FIG. 6, according to a third embodiment of the present invention.

FIG. 8 schematically shows a recognition unit according to a third embodiment of the present invention. In this embodiment, the path selecting section 73 comprises a path input section 73a having one path input terminal 73a1, a path output section 73b having two path output terminals 73b1 and 73b2, and a switch 73c. The switch 73c switches the connection between the path input terminal 73a1 of the path input section 73a and the path but put terminals 73b1 and 73b2 of the path output section 73b based on a value inputted thereto from the quantizer 2.

Figure 9:
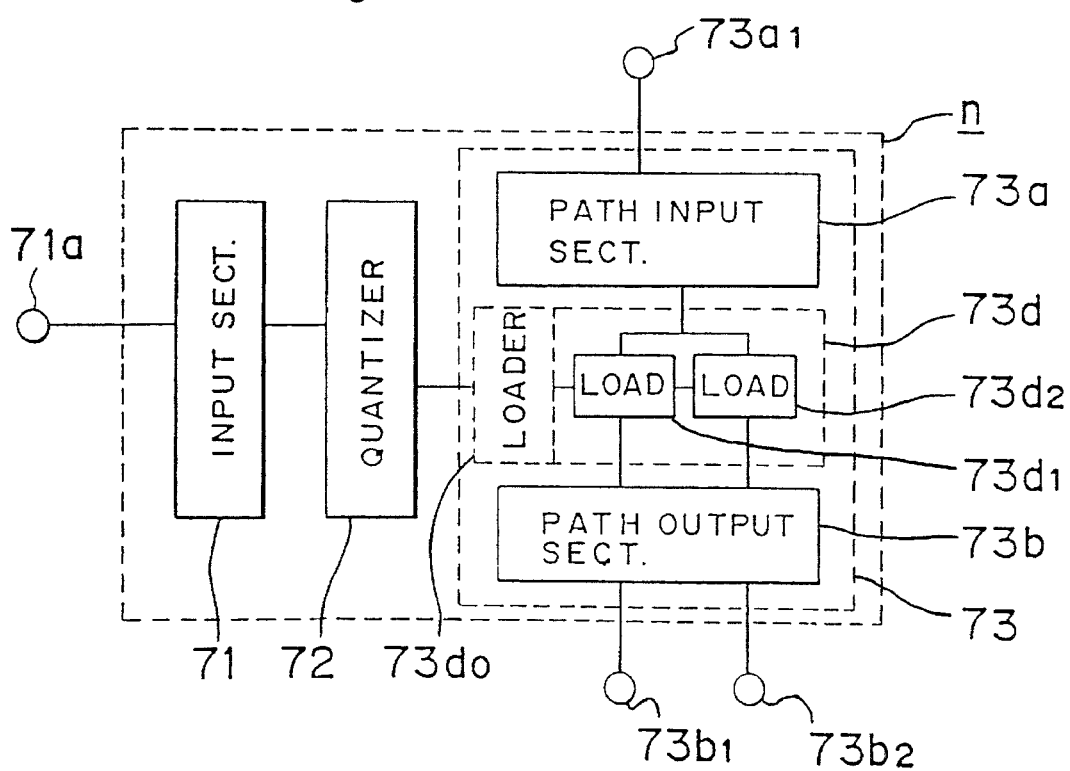
FIG. 9 is a diagram similar to FIG. 6, according to a fourth embodiment of the present invention.

FIG. 9 schematically shows a recognition unit according to a fourth embodiment of the present invention. In this embodiment, the path selecting section 73 comprises a path input section 73a having one path input terminal 73a1, a path output section 73b having two path output terminals 73b1 and 73b2, and a path loading section 73d. Loads 73d1 and 73d2 are weights to be applied to path output signals to be outputted to the path output terminals 73b1 and 73b2 of the path output section 73b, respectively. A loader 73d0 changes these loads according to a value outputted from the quantizer 72. The loads 73d1 and 73d2 weight a path signal inputted from the path input section whereas the path output section 73b outputs the weighted path signal to the path output terminals 73b1 and 73b2.

Figure 10:
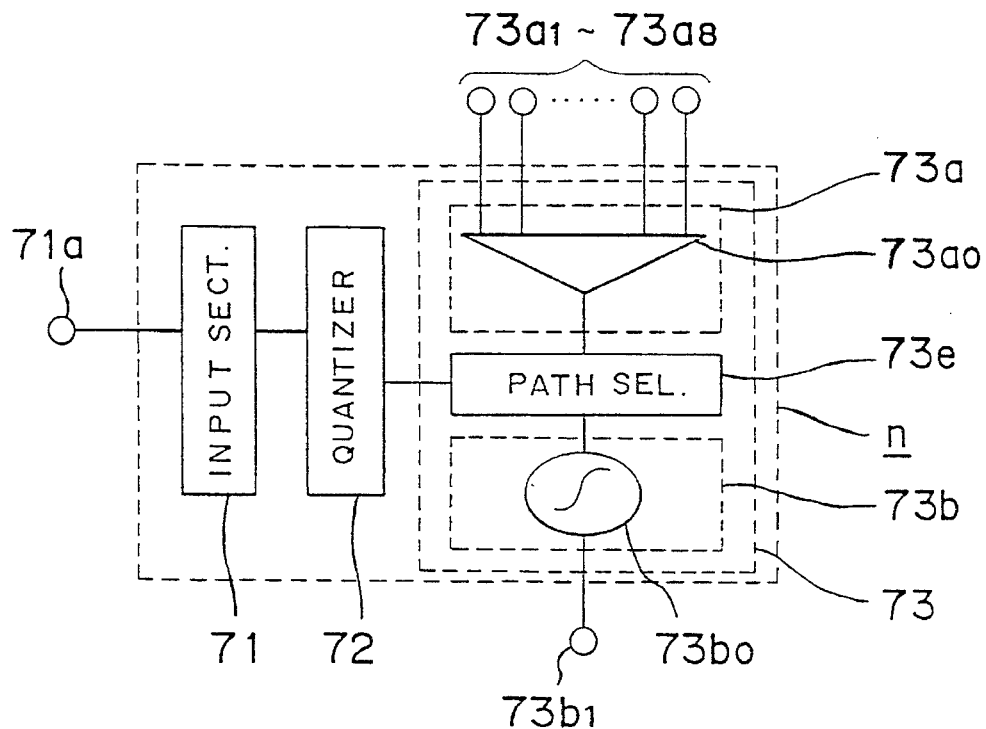
FIG. 10 is a diagram similar to FIG. 6, according to a fifth embodiment of the present invention.

FIG. 10 schematically shows a recognition unit according to a fifth embodiment of the present invention. In this embodiment, the path input section 73a comprises an adder 73a0 for adding input signals from a plurality of path input terminals to one another whereas the path output section 73b comprises a threshold processor 73b0 for performing threshold processing with respect to path signals. The adder 73a0 adds path signals inputted from eight path input terminals 73a1–73a8 and inputs the result of addition to a path selector 73e. The path selector 73e decides how to output a signal obtained through the addition to the path output terminal according to a value outputted from the quantizer 72. The path selector 73e may be of either the construction as shown in FIG. 8 or that as shown in FIG. 9. In this embodiment, because only one path output terminal is provided in the path output section, the path selector 73e decides whether or not the path signal is outputted in the case where the construction as shown in FIG. 8 is employed or the path selector 73e changes the load for weighting the path signal in the case where the construction as shown in FIG. 9 is employed.

Figure 11:
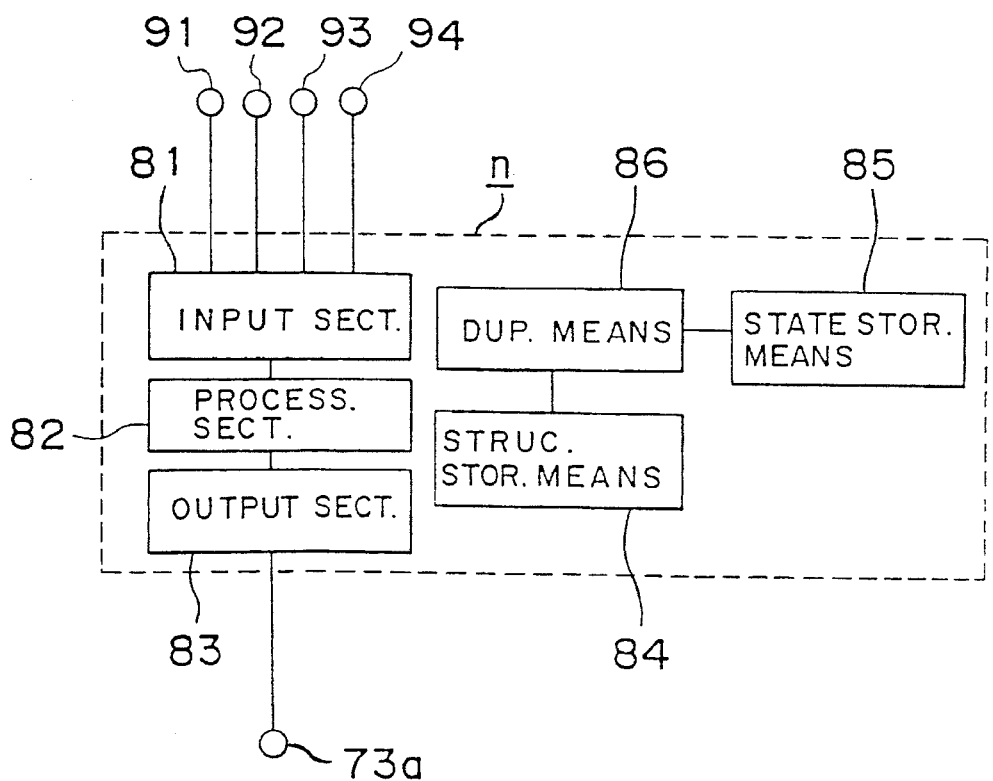
FIG. 11 is a diagram similar to FIG. 6, according to a sixth embodiment of the present invention.

FIG. 11 schematically shows a recognition unit according to a sixth embodiment of the present invention. The recognition unit comprises a signal input section 81 to which various data signals are inputted through signal input terminals 91–94, and a function-processing section 82 for processing inputted data using a function, for example a threshold function such as Sigmoid function, and a signal output section 83 for outputting processed data via an output terminal 83a thereof. When a network is constituted by the combination of a plurality of recognition units, respective signal input terminals 91–94 and signal output terminals 83a thereof are connected with one another. The recognition unit according to this embodiment further comprises a structure storage means 84, an internal state storage means 85, and a duplicating means 86. The structure storage means 84 stores various informations such as the structure of the signal input section 81, the number of output terminals of the signal output section 83, and the contents processed by the function-processing section 82. The internal state storage means 85 stores the internal state of the recognition unit which changes momentarily in response to inputted signals. The duplicating means 86 duplicates the recognition unit according to the structure of the recognition unit stored in the structure storage means 84 when the internal state stored in the internal state storage means 85 reaches a certain value.

Figure 12:
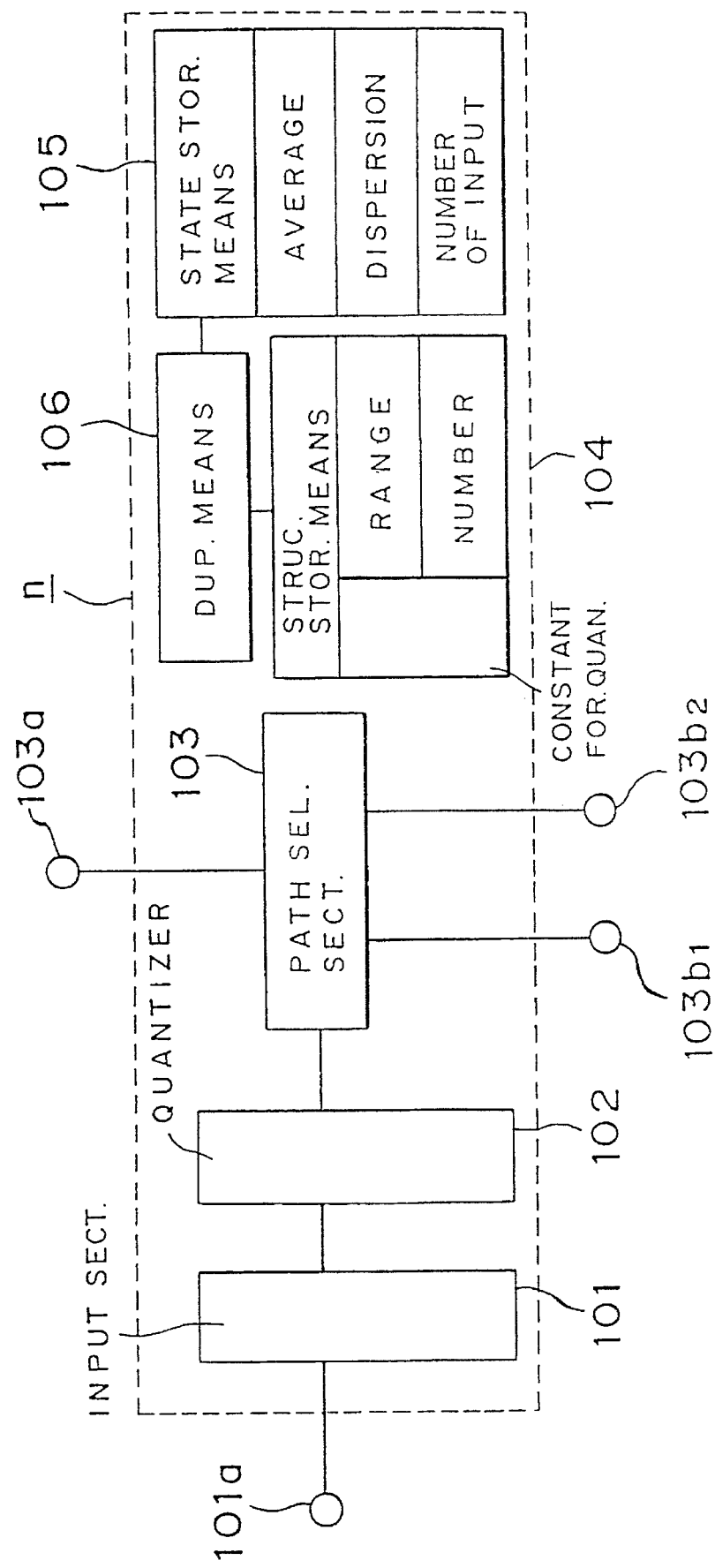
FIG. 12 is a diagram similar to FIG. 6, according to a seventh embodiment of the present invention.

FIG. 12 schematically shows a recognition unit according to a seventh embodiment of the present invention. The recognition unit comprises a signal input section 101 to which characteristic data to be recognized are inputted via a signal input terminal 101a, a quantizer 102 for quantizing the inputted characteristic data, and a path selecting section 103 for changing the connection between a path input terminal 103a and path output terminals 103b1 and 103b2 based upon a value quantized by and inputted from the quantizer 102. When a network is constituted by the combination of a plurality of recognition units, respective terminals 103a, 103b1 and 103b2 of the recognition units are connected with one another. The recognition unit further comprises a structure storage means 104, an internal state storage means 105, and a duplicating means 106. The structure storage means 104 stores the range to be quantized by the quantizer, the number of quantization, the number of the path input and output terminals of the path selecting section 103. The internal state storage means 105 stores the average, dispersion, and total number of inputted signals as the internal state of the recognition unit. The duplicating means 106 duplicates the recognition unit according to the structure of the recognition unit stored in the structure storage means 104 when the internal state stored in the internal state storage means 105 reaches a certain value.

Figure 13:
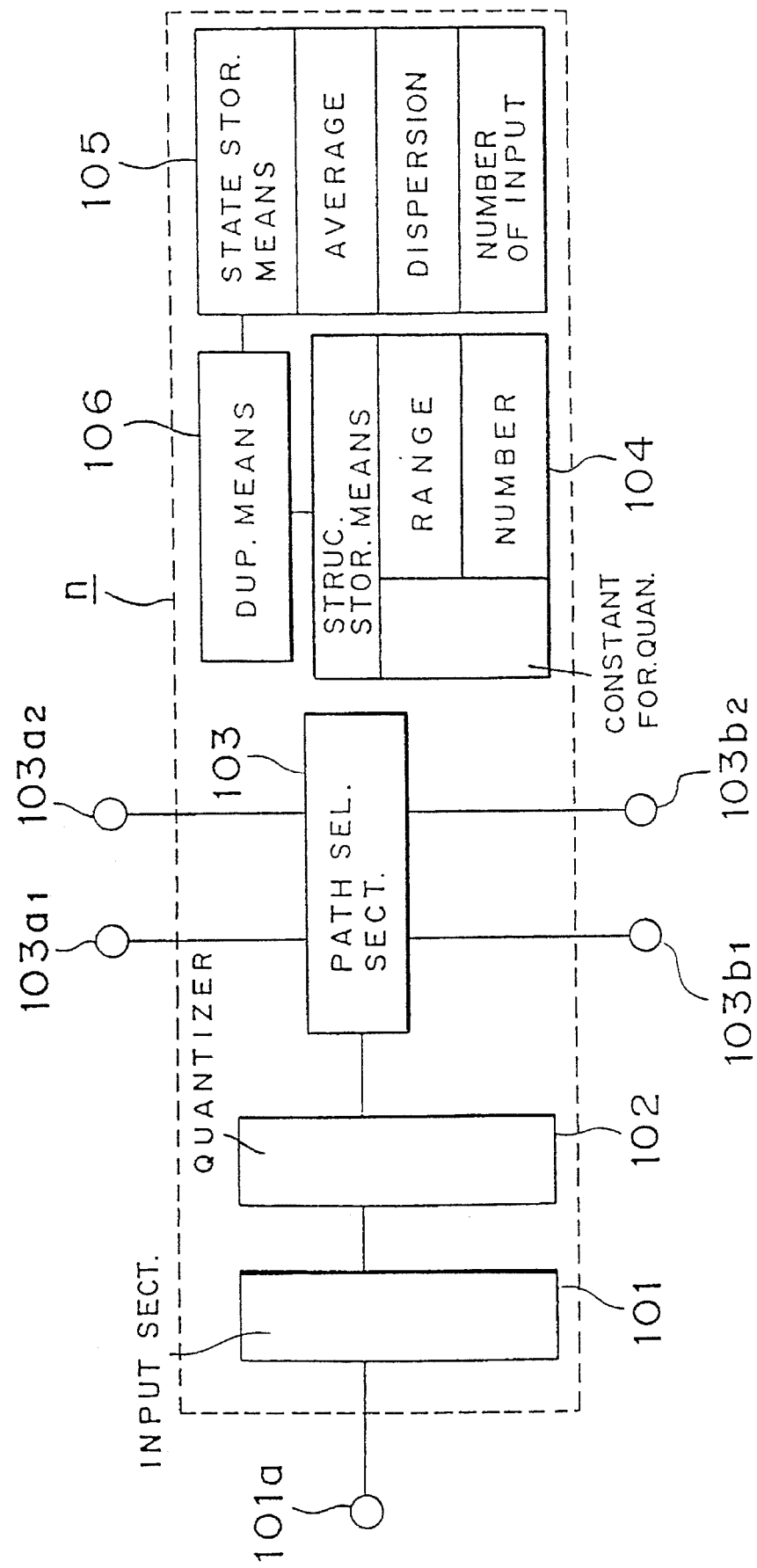
FIG. 13 is a diagram similar to FIG. 6, according to an eighth embodiment of the present invention.

FIG. 13 schematically shows a recognition unit according to an eighth embodiment of the present invention, in which a plurality of path input terminals (in this case, two path input terminals, 103a1 and 103a2) are provided. This recognition unit can be operated similarly to that shown in FIG. 12.

Figure 14:
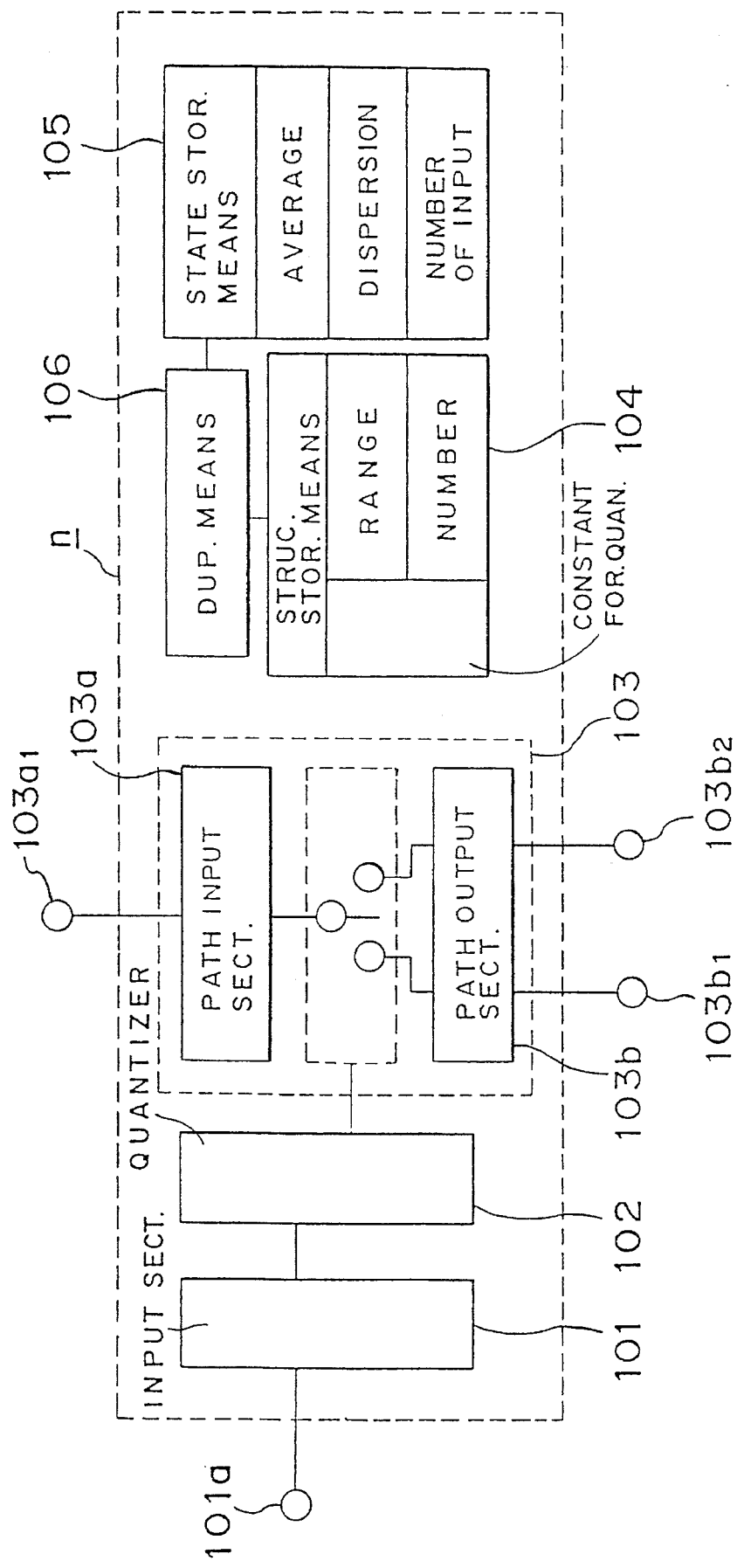
FIG. 14 is a diagram similar to FIG. 6, according to a ninth embodiment of the present invention.

FIG. 14 schematically shows a recognition unit according to a ninth embodiment of the present invention. In this embodiment, a path selecting section 103 is constructed by a path input section 103a having one path input terminal 103a1, a path output section 103b having two path output terminals 103b1 and 103b2, and a switch 103c. The switch 103c connects the path input terminal 103a1 of the path input section 103a and the path output terminal 103b1 or 103b2 of the path output section 103b with each other based on a value inputted thereto from the quantizer 102.

Figure 15:
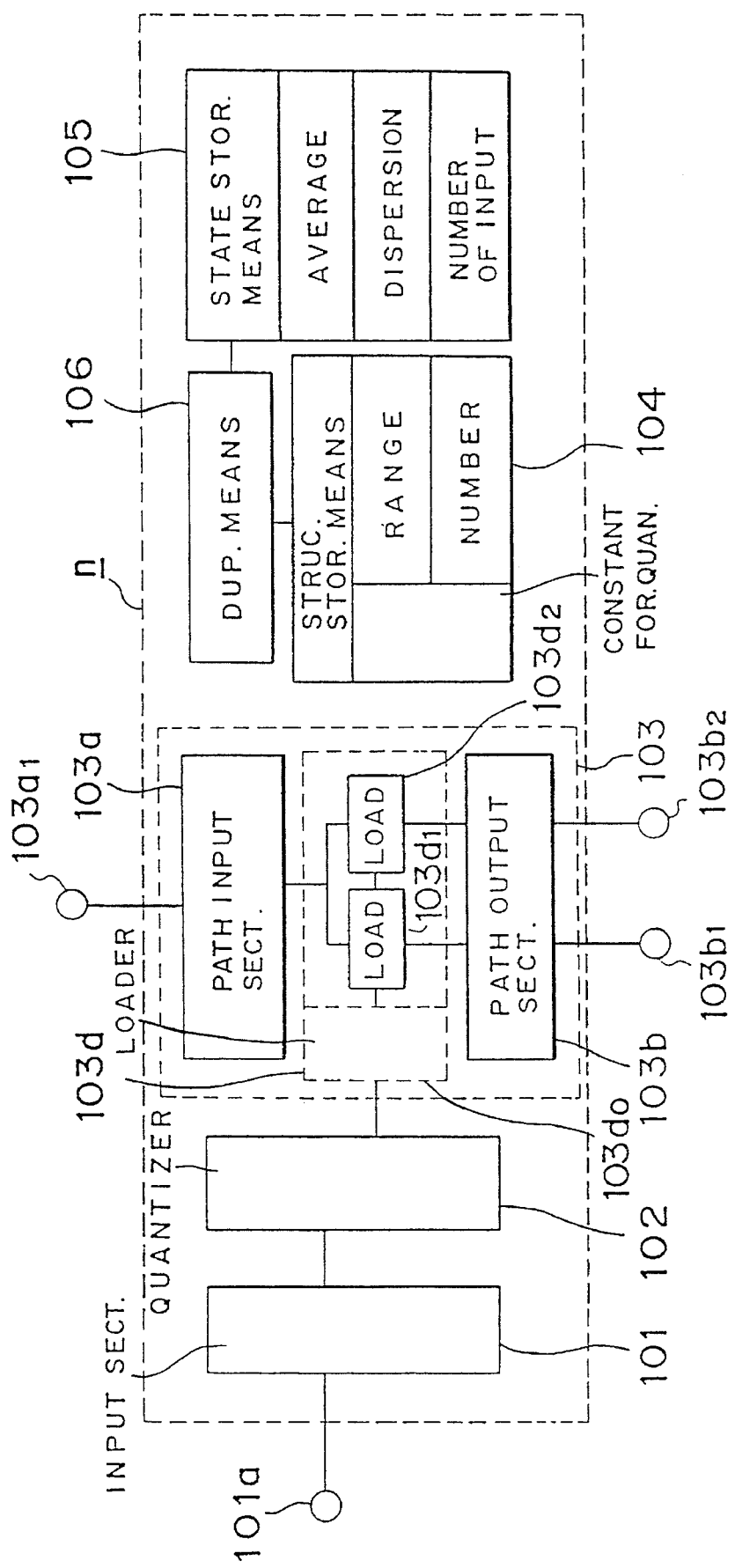
FIG. 15 is a diagram similar to FIG. 6, according to a tenth embodiment of the present invention.

FIG. 15 schematically shows a recognition unit according to a tenth embodiment of the present invention. In this embodiment, a path selecting section 103 comprises a path input section 103a having one path input terminal 103a1 and a path output section 103b having two path output terminals 103b1 and 103b2, and a path loading section 103d. Loads 103d1 and 103d2 are weights to be applied to path output signals to be outputted to the path output terminals 103b1 and 103b2 of the path output section 103b, respectively. A loader 103d0 changes these loads according to a value outputted from the quantizer 102. The loads 103d1 and 103d2 weight a path signal inputted from the path input section whereas the path output section 103b outputs the weighted path signal to the path output terminals 103b1 and 103b2.

Figure 16:
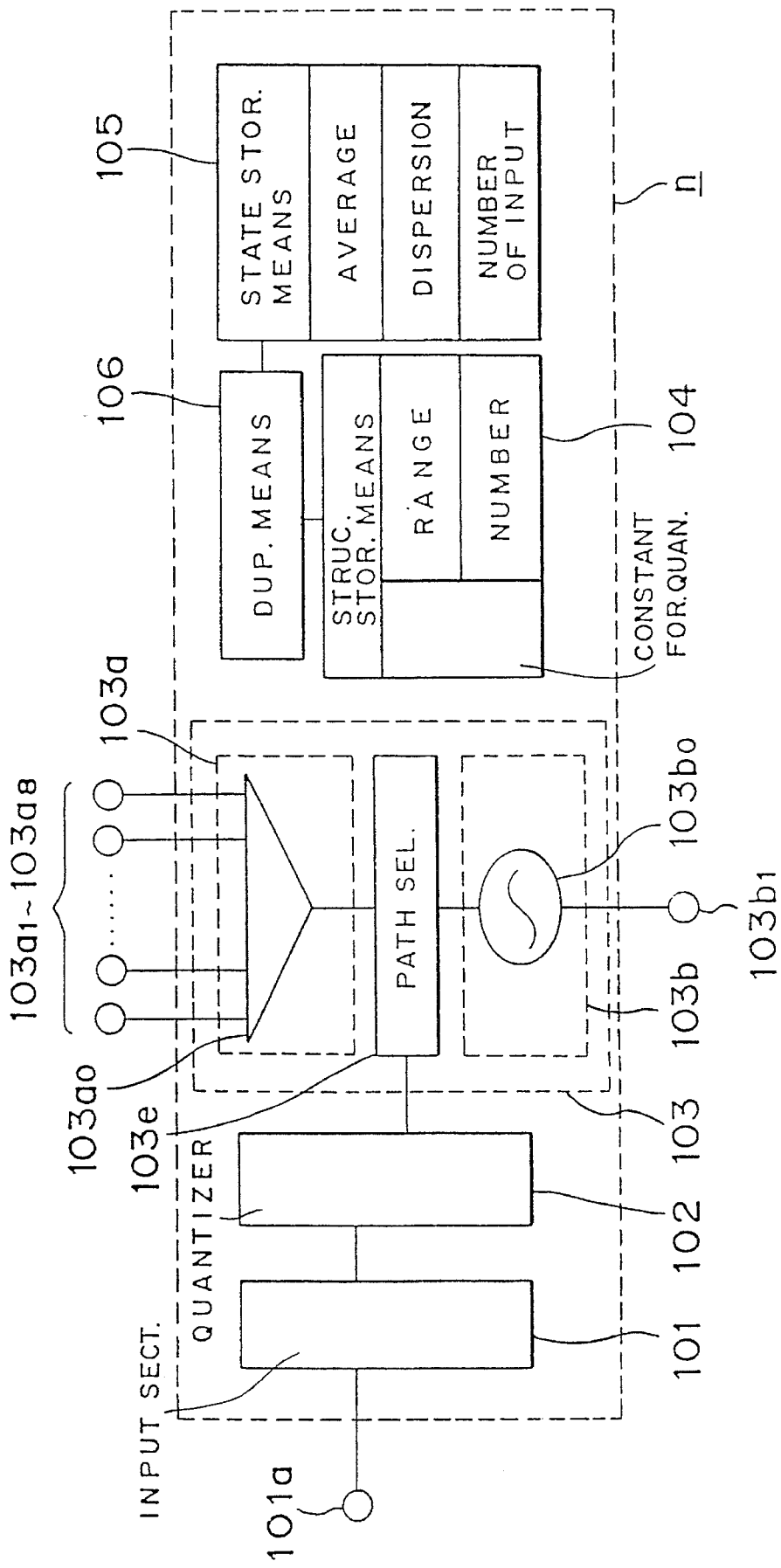
FIG. 16 is a diagram similar to FIG. 6, according to an eleventh embodiment of the present invention.

FIG. 16 schematically shows recognition unit according to an eleventh embodiment of the present invention. In this embodiment, a path input section 103a comprises an adder 103a0 for adding input signals from a plurality of path input terminals whereas a path output section 103b comprises a threshold processor 103b0 for performing threshold processing with respect to path signals. The adder 103a0 adds path signals inputted from eight path input terminals 103a1–103a8 and inputs the result of addition to a path selector 103e. The path selector 103e decides how to output a signal obtained through the addition to the path output terminal according to a value outputted from the quantizer 102. The path selector 103e may be of either the construction as shown in FIG. 14 or that as shown in FIG. 15. In this embodiment, because only one path output terminal is provided in the path output section, the path selector 103e decides whether or not the path signal is outputted in the case where the construction as shown in FIG. 14 is employed or the path selector 103e changes the load for weighting the path signal in the case where the construction as shown in FIG. 15 is employed.

Figure 17:
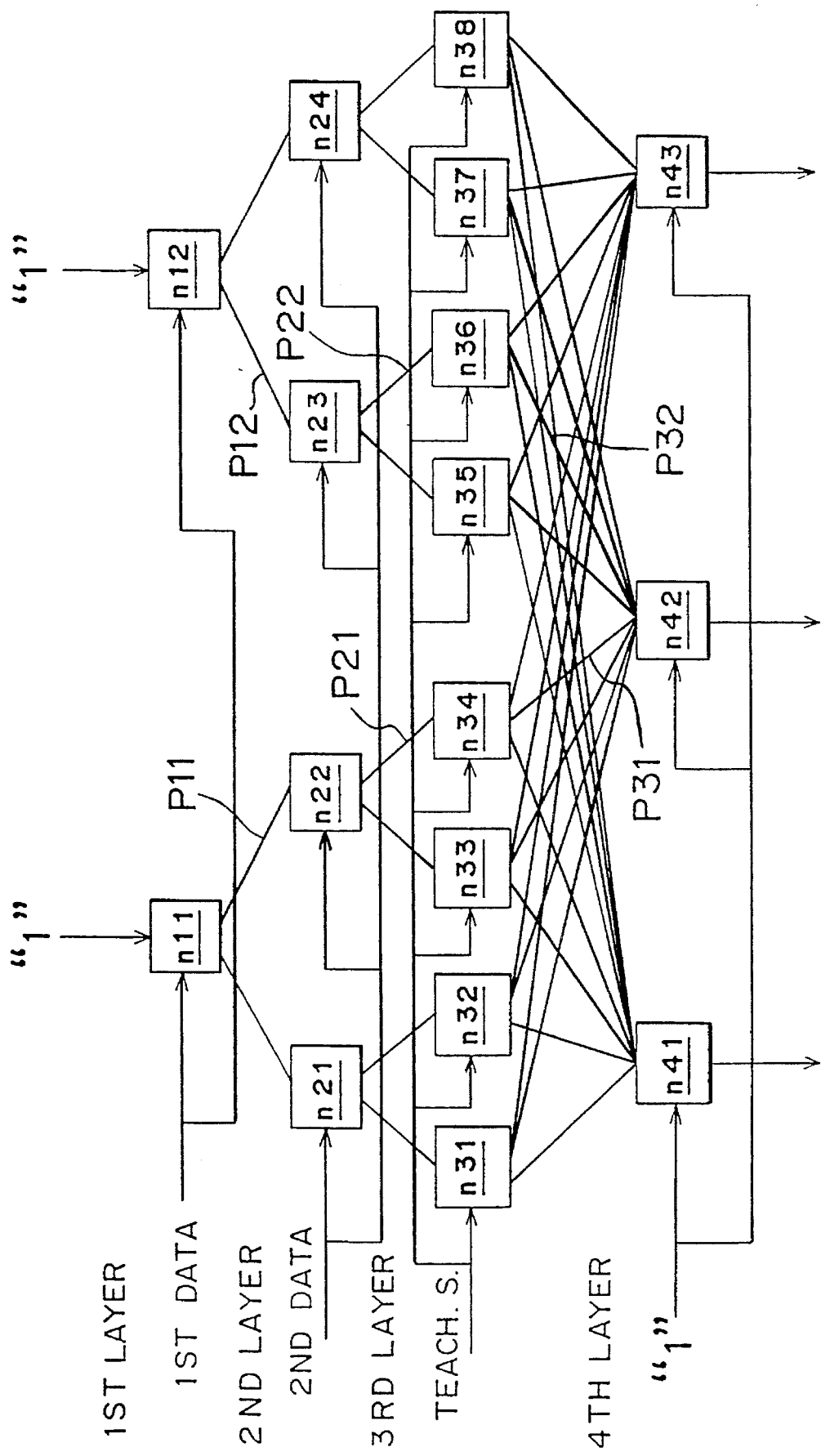
FIG. 17 is a block diagram of a recognizing and judging apparatus employing a plurality of recognition units according to the present invention.

FIG. 17 schematically shows a recognizing and judging apparatus, in which a network is constructed by connecting a plurality of recognition units according to the present invention in a multi-layered hierarchical structure. The recognition unit as shown in FIG. 8 is used as recognition units n11–n12, n21–n24, and n31–n38 constituting a first, a second, and a third layer, respectively. As described previously, a path selecting section 73 comprises a path input section 73a having one path input terminal 73a1, a path output section 73b having two path output terminals 73b1 and 73b2, and a switch 73c. The recognition unit as shown in FIG. 10 is used as recognition units n41–n43 constituting a fourth layer. In this recognition unit, a path input section 73a comprises an adder 73a0 for adding input signals from the plurality of path input terminals whereas a path output section 73b comprises a threshold processor 73b0 for performing threshold processing with respect to path signals. The recognizing and judging apparatus as shown in FIG. 17 classifies objects to be recognized into three categories based upon three kinds of each two characteristic data.

The learning operation of the recognizing and judging apparatus shown in FIG. 17 is as follows.

"1" is initially given as a path signal to the path input terminal of each of the recognition units n11 and n12 of the first layer. A series of first characteristic data of an object to be recognized are inputted to the signal input terminal of the quantizer of each of these units. (In this figure, two first characteristic data are inputted to two recognition units, respectively.) These first characteristic data are quantized by the quantizers of the recognition units n11 and n12. Paths p11 and p12 are then selected by the switch shown in FIG. 8 based on respective values quantized, and a path signal "1" is sent to the path input terminal of each of the recognition units n22 and n23 of the second layer. A series of second characteristic data of the object are inputted to the signal input terminal of each quantizer of these units. (In this figure, two second characteristic data are inputted to two recognition units n22 and n23, respectively.) These second characteristic data are quantized by the quantizers of the recognition units n22 and n23. Paths p21 and p22 are then selected by the switch shown in FIG. 8 based upon respective values quantized, and a path signal "1" is sent to the path input terminal of each of the recognition units n34 and n36 of the third layer. A teacher signal indicating which of three categories to be classified the object belongs to, namely, a signal indicating which of n41–n43 should be selected is inputted to the signal input terminal of the quantizer of each of these units. (In this figure, the teacher signal is inputted to two recognition units n34 and n36.) The teacher signal is quantized by the quantizers of the recognition units n34 and n36, and paths p31 and p32 are selected by the switch shown in FIG. 8 based on values quantized.

As described above, in the learning process of the recognizing and judging apparatus according to the present invention, various characteristic data of each object to be recognized are inputted to the signal input section of each recognition unit constituting a multi-layered hierarchical network. Connection paths between recognition units are switched according to outputs of the quantizers. In a layer adjacent to the lowermost layer, the teacher signal merely determines the selection of path towards the lowermost layer. Accordingly, the learning processing can be performed at a very high speed. Furthermore, the apparatus according to the present invention is superior in-additional learning because, fundamentally, only the addition or alteration of connection paths of recognition units is required to perform the additional learning.

The recognition operation by the apparatus according to the present invention is as follows.

In the recognition units n11, n12, n22, and n23, similarly to the learning operation, respective quantizers quantize inputted characteristic data, and connection paths are switched based on values quantized, thereby sequentially selecting the paths p11, p12, p21, and p22. In the recognition operation, no teacher signal is inputted to the signal input terminal of each of the recognition units n34 and n36. Accordingly, the state of the switches during the learning is kept, and the paths p31 and p32 are selected according to the state of these switches, and a path signal "1" is sent to the path input terminal of the recognition unit n42 of the fourth layer. The adder of the path input section of this unit adds path signals inputted through the paths p31 and p32 to each other. The signal "1" is inputted to the signal input terminal of the signal input section, and the quantizer quantizes this signal so that the path selector may enable the path output. (When a signal "0" is inputted, the path selector switches so that the path output may be disabled.) A path signal obtained through the addition is Sent to the path output section, which performs threshold processing with respect thereto and outputs the processing result to the path output terminal. Accordingly, when the signal after the addition is greater than a certain threshold value, the signal is outputted through the path output terminal. In this way, objects to be recognized can be classified into respective appropriate categories for recognition and judgement thereof based on inputted characteristic data thereof. Sigmoid function, Step function or the like can be used as a function for performing the threshold processing.

As described above, in the recognizing process of the recognizing and judging apparatus according to the present invention, various characteristic data of each object to be recognized are inputted to the signal input section of each recognition unit constituting a multi-layered hierarchical network. Connection paths between recognition units are switched according to outputs of respective quantizers. In a layer adjacent to the lowermost layer, a recognition result is obtained only by determining the selection path to the lowermost layer based on a connection path set in the learning process. Therefore, recognition processing can be performed at a very high speed based on the learning result.

The duplicating operation of the recognition unit shown in FIGS. 11 to 16 is discussed hereinafter With reference to FIG. 12.

In order to produce a duplicate, it is necessary to prepare unused vacant recognition units not connected with other recognition units. A signal taking a value from 1 to 10 is initially inputted to the signal input terminal 101a of the signal input section 101 of the recognition unit, which originates the duplicate. The range of quantization by the quantizer 102 is set to 1 to 10. The internal state storage means 105 calculates and stores the average, dispersion, and the number of inputs of sequentially inputted data signals whenever a data signal is inputted. When the product of the number of inputs and the dispersion exceeds a certain value, the duplicating means duplicates information of this recognition unit to an unused vacant recognition unit with reference to the range of quantization of the quantizer, the number of quantization, and the number of path input and output terminals of the path selecting section stored in the structure storage means. At the same time, the duplicating means produces a duplicate identical to itself including the connection with other recognition units. In this event, the duplicate is produced so that the original unit and the duplicate shares functions by dividing a necessary range of quantization into 1 to 10, for example, by setting the range of quantization of the quantizer of the original recognition unit to 1 to 5 and the range of quantization of the quantizer of the duplicate to 6 to 10.

Figure 18:
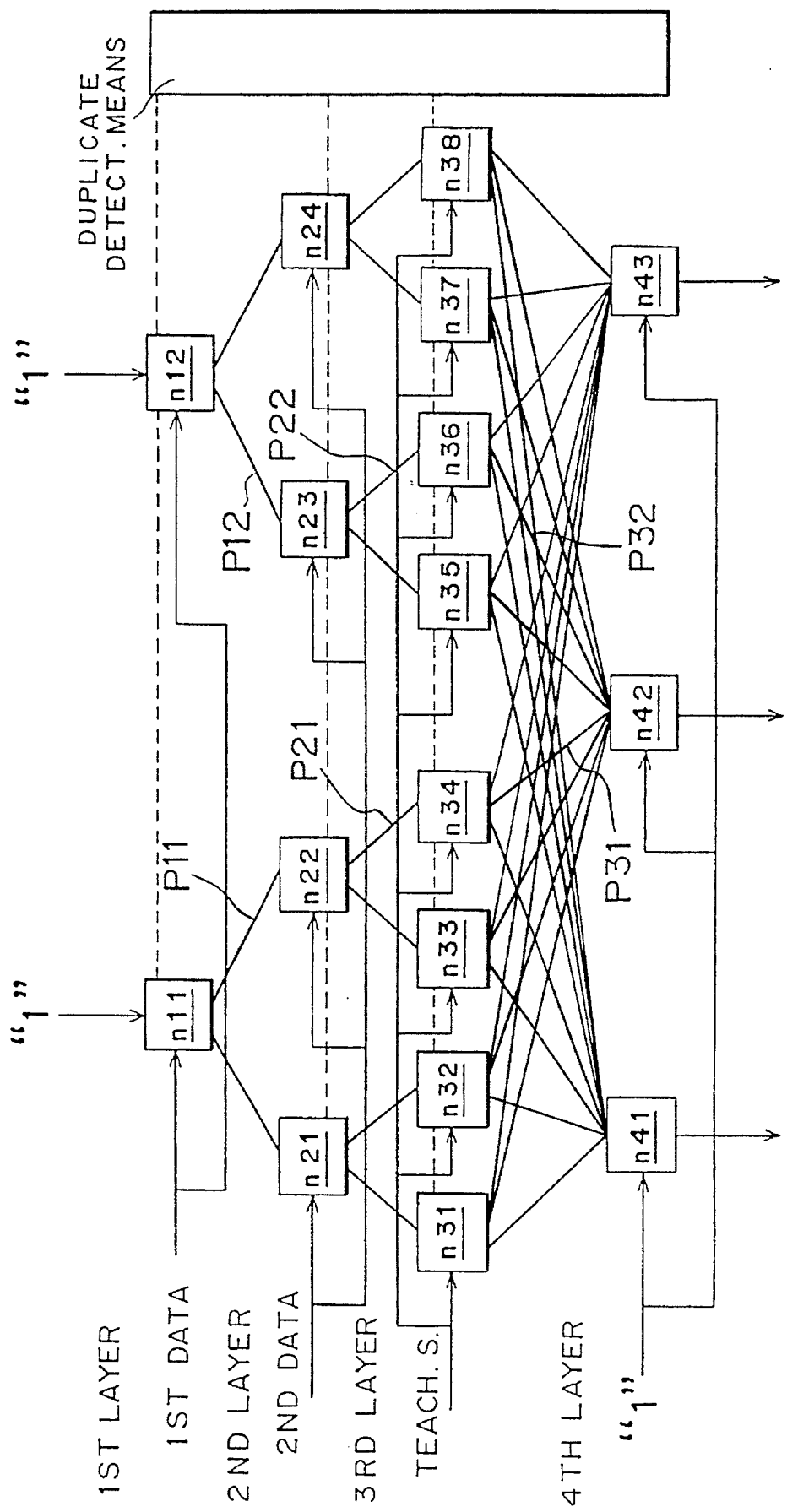
FIG. 18 is a diagram similar to FIG. 17, indicating a learning type recognizing and judging apparatus employing a plurality of recognition units according to the present invention.

FIG. 18 schematically shows a learning type recognizing and judging apparatus according to the present invention. A network is constructed by connecting a plurality of recognition units with one another in a multi-layered hierarchical structure. The recognition unit as shown in FIG. 14 is used as recognition units n1–n12, n21–n24, and n31–n38 constituting a first, a second, and a third layer, respectively. As described previously, the path selecting section 103 comprises the path input section 103a having one path input terminal 103a1, the path output section 103b having two path output terminals 103b1 and 103b2, and the switch 103c. The recognition unit as shown in FIG. 16 is used as recognition units n41–n43 constituting a fourth layer, and as described previously, the path input section 103a comprises the adder 103a0 for adding input signals from the plurality of path input terminals whereas the path output section 103b comprises the threshold processor 103b0 for performing threshold processing with respect to path signals. The learning type recognizing and judging apparatus as shown in FIG. 18 classifies objects to be recognized into three categories based upon three kinds of each two characteristic data.

The learning operation of the learning type recognizing and judging apparatus shown in FIG. 18 is substantially the same as that of the recognizing and judging apparatus shown in FIG. 17.

The operation of duplicating recognition units in the learning type recognizing and judging apparatus shown in FIG. 18 is discussed hereinafter with reference to FIG. 19.

Figure 19:
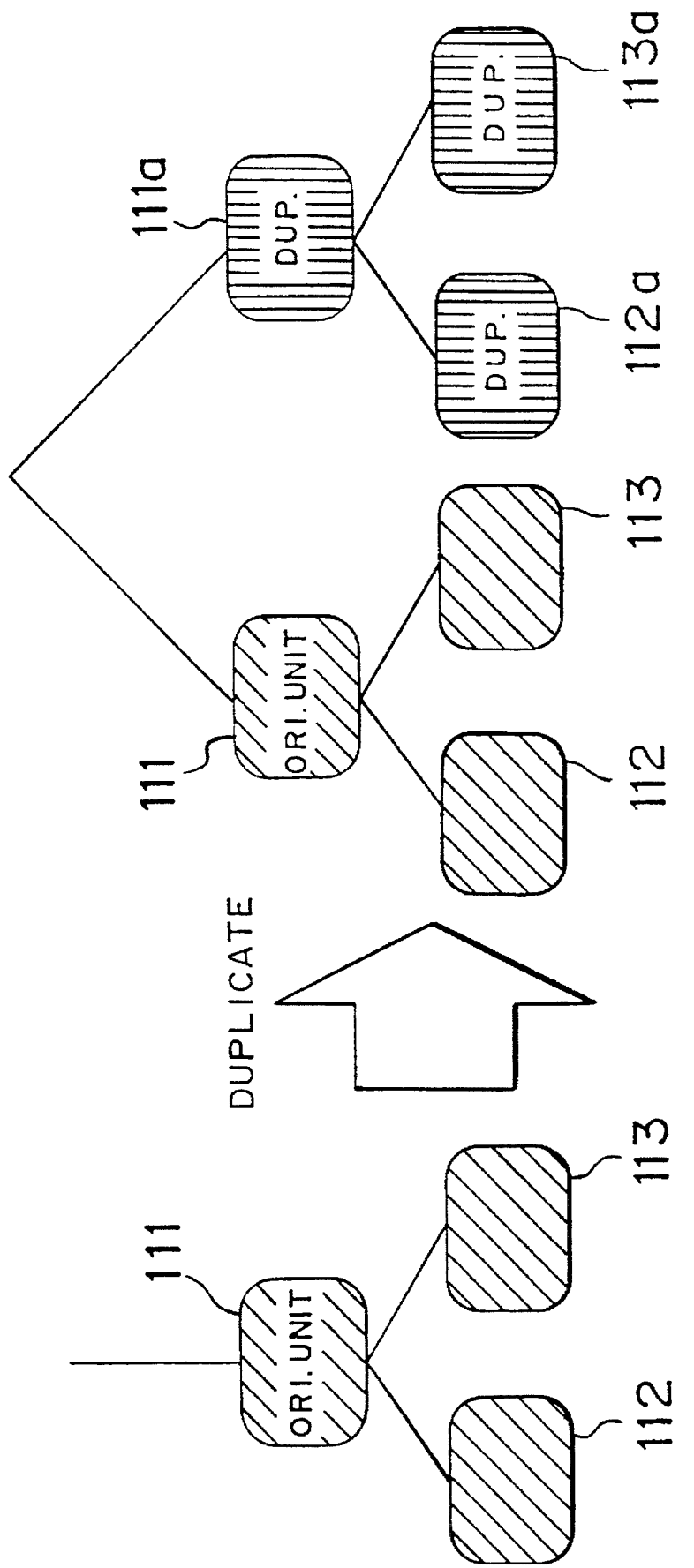
FIG. 19 is a schematic diagram indicating a duplicating operation performed in the learning type recognizing and judging apparatus of FIG. 18.

When a recognition unit of a certain layer in the first to the fourth layer is duplicated, it is necessary to produce duplicates including all recognition units connected thereto in the lower layer thereof, as shown in FIG. 19. A duplicate detecting section S detects all recognition units which have initiated a duplicate operation, thus issuing instructions so that all recognition units including those connected thereto in the lower thereof may be duplicated. For example, a recognition unit 111 is duplicated together with recognition units 112 and 113 both connected thereto in the lower layer thereof, i.e., a duplicate recognition unit 111a and duplicate recognition units 112a and 113a connected thereto in the lower layer thereof are newly produced. Accordingly, not only the learning of a network is performed in response to input data, but also the structure of the network can be automatically altered, constructed, and self-organized according to input signals so that the network may adapt itself to the input signals.

As described above, in the process of producing duplicates in the learning type recognizing and judging apparatus according to the present invention, the internal state of each recognition unit changes according to input data, and the duplicate detecting means initiates the duplicating operation. As a result, a plurality of duplicates of recognition units are produced. Accordingly, the apparatus according to the present invention can readily adapt itself to new data which the apparatus has not learned.

Similar to the recognizing and judging apparatus as shown in FIG. 17, the learning type recognizing and judging apparatus shown in FIG. 8 can perform the learning processing at a very high speed.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recognition unit comprising:

a signal input section for receiving a signal to be recognized;

a quantizer for mapping an input data value inputted from said signal input section into a discrete value; and a path selecting section having at least one path input terminal which is connected to a path output terminal of another recognition unit and at least one path output terminal which is connected to a path input terminal of another recognition unit, said path selecting section making a connection between said path input terminal of said path selecting section and said path output terminal of said path selecting section according to an output of said quantizer.

2. The recognition unit according to claim 1, wherein said path selecting section comprises a path input section having at least one path input terminal which is connected to a path output terminal of another recognition unit, a path output section having at least one path output terminal which is connected to a path input terminal of another recognition unit, and a switch for switching the connection between said path input terminal of said path input section and said path output terminal of said path output section according to said output of said quantizer.

3. The recognition unit according to claim 1, wherein said path selecting section comprises a path input section having at least one path input terminal which is connected to a path output terminal of another recognition unit, a path output section having at least one path output terminal which is connected to a path input terminal of another recognition unit, and a loader for changing a strength of the connection between said path input terminal of said path input section and said path output terminal of said path output section according to said output of said quantizer.

* * * * *

UNITED STATES PATENT AND TRADEMARK OFFICE
CERTIFICATE OF CORRECTION

PATENT NO. : 5,485,547
DATED : January 16, 1996
INVENTOR(S) : Susumu MARUNO

It is certified that error appears in the above-indentified patent and that said Letters Patent is hereby corrected as shown below:

Cover page, add "[*] Notice: The term subsequent to May 16, 2011, has been disclaimed."

Signed and Sealed this

Eighteenth Day of March, 1997

*Attest:*

BRUCE LEHMAN

*Attesting Officer*　　　　　*Commissioner of Patents and Trademarks*